Aug. 20, 1935.  J. W. SIMMONS  2,012,175
FRUIT CRATE
Filed June 18, 1934  2 Sheets-Sheet 1

Inventor
JACK W. SIMMONS
By Mason Fenwick Lawrence
Attorneys

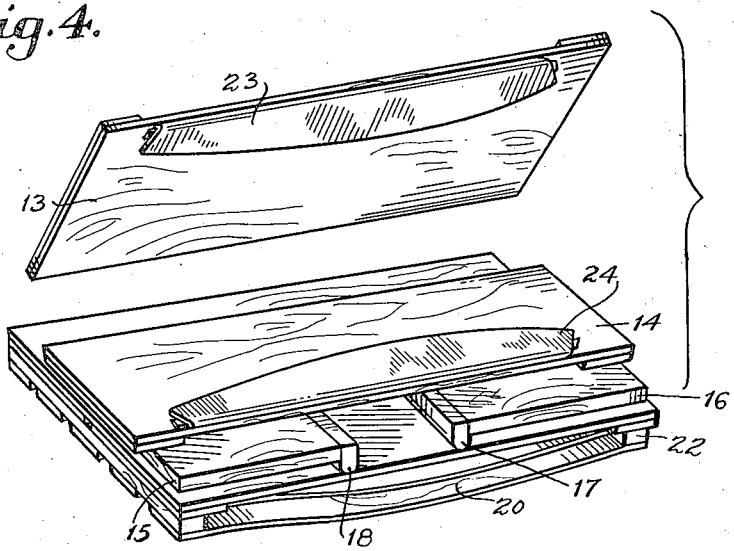
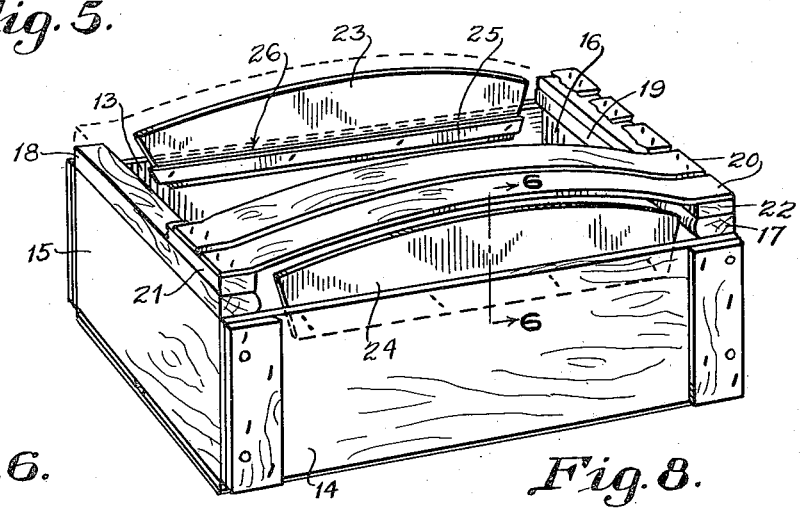
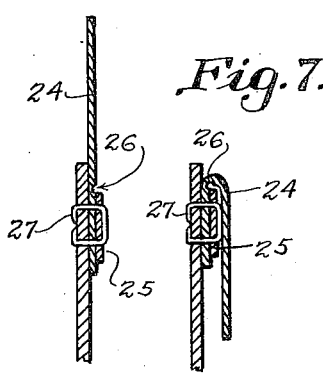
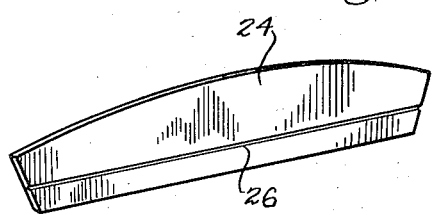

Patented Aug. 20, 1935

2,012,175

UNITED STATES PATENT OFFICE 2,012,175

FRUIT CRATE

Jack W. Simmons, Tallahassee, Fla.

Application June 18, 1934, Serial No. 731,189

2 Claims. (Cl. 217—3)

This invention relates to fruit crates and guards therefor, and has for its main object the provision of upstanding marginal lining members permanently secured to the sides of crates, and adapted to extend above the top edges of these sides, to protect the top layers of fruits or vegetables packed in the crates by the usual bulge-pack method.

Another object of the invention is to provide knock-down crates of this type having foldable guards permanently secured thereto and adapted to be extended above the top edges of the sides to which they are secured.

Other objects of the invention will appear as the following description of preferred and practical embodiments thereof proceeds.

In the accompanying drawings which form a part of the following specification and throughout the several figures of which, the same characters of reference have been employed to designate identical parts:

Figure 4 is an exploded perspective showing all the elements of a knock-down form of lug box embodying the present invention;

Figure 5 is a perspective view of the lug box shown in Figure 4 in assembled form;

Figure 6 is a vertical section taken on the line 6—6 of Figure 5;

Figure 7 is a view similar to Figure 6 showing one of the guards in folded position; and Figure 8 is a perspective view of one of the guards used on the side walls of the lug box shown in Figures 4 and 5.

Figure 1:
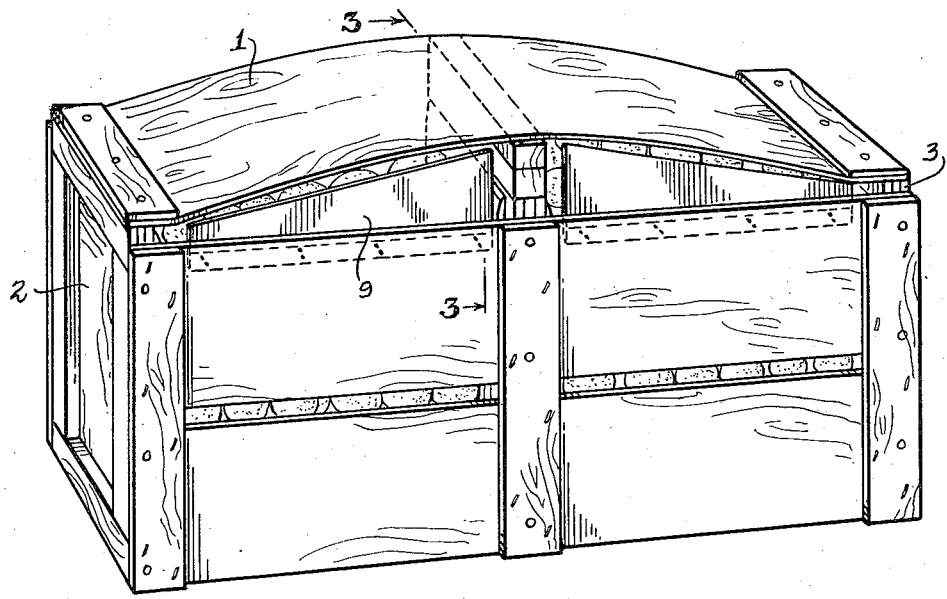
Figure 1 is a perspective view of an orange box embodying the present invention.
Figure 2:
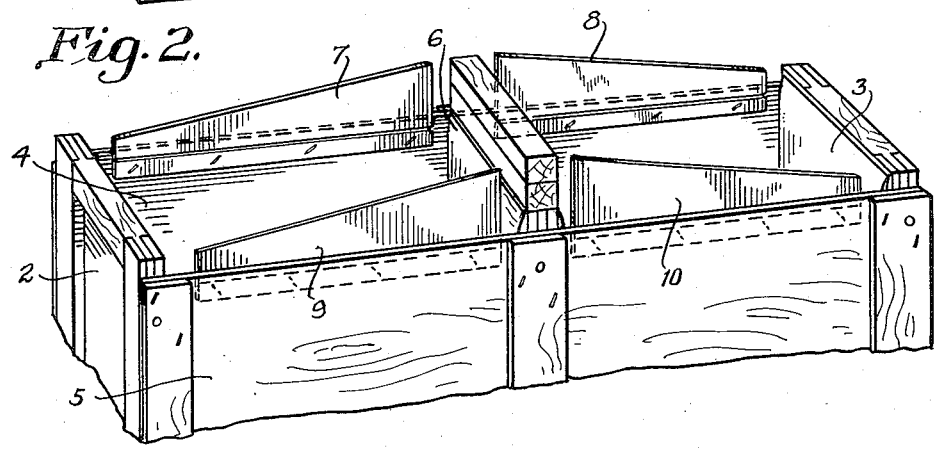
Figure 2 is a fragmentary perspective similar to that shown in Figure 1, but with the cover of the box removed.
Figure 3:
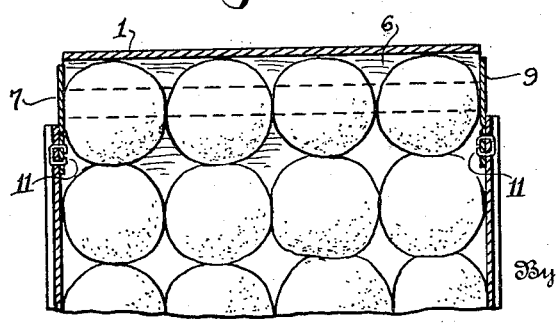
Figure 3 is a vertical transverse section taken on the line 3—3 of Figure 1.

As shown in Figures 1 to 3, inclusive, of the drawings, the invention comprises an orange box consisting of a top 1, end walls 2 and 3, side walls 4 and 5, bottom (not shown), and a center partition 6. In this construction the upper edges of the end walls 2 and 3 extend slightly above the upper edges of the side walls 4 and 5; and the center partition 6 extends above the side walls 4 and 5 for a greater distance than the end walls 2 and 3. By this construction, the top 1 when secured to the top edges of the end walls 2 and 3 and partition 6 assumes the arcuate form common in orange crates of the bulge-pack type.

In order to close the spaces between the top edges of the sides 4 and 5 and the lower face of the top 1, the sides 4 and 5 have permanently secured thereto the guards 7, 8, 9 and 10, respectively, on opposite sides of the partition 6. These guards are cut roughly to correspond with the inclination of the parts of the top 1 extending in opposite directions from the partition 6 relative to the top edges of the sides 4 and 5; and are permanently secured to the sides 4 and 5. Since the sides of crates of this type are made of thin veneer or thin strips of wood; and, since the guards are usually formed of fairly stiff cardboard, it is preferable to stitch the guards to these sides by staples 11, which can be very readily used for this purpose by machinery in common use.

The form of the invention illustrated in Fig. 4 is intended to be shipped from the factory in knock-down form to be assembled at the packing plant. This form is the lug box type of crate, and comprises a top 12, sides 13 and 14, end walls 15 and 16 and bottom 17. The top edges of the ends 15 and 16 extend above the top edges of the sides 13 and 14. The extension of the ends 15 and 16 may be effected by nailing cleats 18 and 19 to the top edges of the ends 15 and 16. The top 12 is constructed by nailing the opposite ends of strips 20 of thin material to cleats 21 and 22. These strips 20 are made slightly longer than the length of the sides 13 and 14 so that when the top is secured to the end walls the strips 20 may be caused to bulge outwardly at their center. This bulging of course is designed to prevent inward buckling of the top with consequent damaging of the fruit packed in the box.

In order to close the space between the top edge of the sides 13 and 14 and the lower face of the top 12, these sides have permanently secured thereto the guards 23 and 24, respectively. Preferably these guards are stitched by stapling machinery to the sides 13 and 14, and are creased or scored lengthwise slightly below the top edges of the sides 13 and 14 so that when folded upwardly, as shown in Figures 5 and 6, the parts of the sides 13 and 14 above the stapling serve as abutments to prevent the guard from bending outwardly over the top edges. The guards are intended to be folded downwardly as shown in Figure 7 of the drawings when the parts of the box are assembled in knock-down form.

In order to reinforce the stitching, clamping plates or strips 25 are placed against the inner faces of the guards 23 and 24 with their top edges directly below the scoring 26 on each guard. The staples 27 are then passed through the clamping strips 25, guards 23 and 24 and the sides 13 and 14 of the box. This construction provides a very strong connection between the sides of the box and the fruit guard and permits the guards to be folded downwardly for convenience in packing for shipment.

Prior to this invention, fruit guards consisted of separate sheets of material shaped to fit the sides and ends of the crates; and were designed for manual insertion by operators during the actual packing of the crates. Many of the guards were wasted or destroyed through carelessness of the packers; and considerable time consumed in applying them to the boxes.

In the present case, the guards are stitched at the crate factory to the sides of the crates, which are then shipped in knock-down form to the packers. There is no waste or danger of loss of the permanently attached guards; and the time consumed in attaching them permanently to the crates is negligible in comparison with that involved in the old method of manual insertion. The folding construction of the guards adapts them for use in knock-down crates since they are folded during shipment to protect them from all possibility of injury.

It is to be understood that the details of construction and the arrangement of parts as herein above described are merely by way of example, and not to be construed as limiting the scope of the invention as defined in the appended claims.

What I claim is:

1. A fruit container comprising a box having side and end walls, guards of flexible board secured permanently to the inside faces of the side walls and extending above the top edges thereof, each guard being creased to fold about an axis substantially parallel to and spaced inwardly from said top edges, whereby the parts of the sides above the crease in each guard prevent said guards from bending outwardly over said top edges.

2. A fruit container comprising a box having side and end walls, guards of flexible board secured permanently to the inside faces of the side walls and extending above the top edges thereof, each guard being creased to fold about an axis substantially parallel to and spaced inwardly from said top edges, and reinforcing strips secured to said guards and side walls directly below the creases of said guards.

JACK W. SIMMONS.